Feb. 17, 1959 W. M. MALLORY ET AL 2,874,302
FLUOROSCOPE
Filed Feb. 16, 1955 2 Sheets-Sheet 1

INVENTOR.
Warren M. Mallory
Carl A. Cinnamon
BY WHITEHEAD & VOGL
PER Albert L. Vogl
ATTORNEYS Feb. 17, 1959   W. M. MALLORY ET AL   2,874,302
FLUOROSCOPE
Filed Feb. 16, 1955   2 Sheets-Sheet 2

INVENTOR.
Warren M. Mallory
Carl A. Cinnamon
BY WHITEHEAD & VOGL
PER
ATTORNEYS

United States Patent Office 2,874,302
Patented Feb. 17, 1959

2,874,302
FLUOROSCOPE

Warren M. Mallory and Carl A. Cinnamon,
Laramie, Wyo.

Application February 16, 1955, Serial No. 488,502

6 Claims. (Cl. 250—78)

This invention relates to fluoroscopes, and more particularly to fluoroscopic inspection apparatus of the class which is used primarily for inspecting and checking earth substances and minerals, a primary object of the invention being to provide a novel and improved fluoroscope which is especially adapted for the inspection and checking of earth minerals and other substances for fluorescence.

Other objects of the invention are to provide a novel and improved inspection fluoroscope which is: (a) primarily adapted for daylight use with sunlight as the illuminating source but is also usable with any light source which emits ultra-violet light; (b) may be adapted to filter out all but selected ultra-violet light waves and thereby provide selective fluorescent indications in objects observed; (c) is adapted for the quick detection of fluorescent substances such as powders, inks and the like on small objects; (d) particularly adapted for field use and field reconnaissance work; (e) especially valuable as an auxiliary instrument in connection with other types of field reconnaissance and detective work, or even as a toy in play in that it is a lightweight and compact unit, being so small that it may be folded and carried in an individual's pocket; (f) adapted to be a valuable educational instrument or toy; and (g) a low-cost, neat and sturdy instrument, which is, nevertheless, efficient and effective.

With the foregoing and other objects in view, all of which more fully hereinafter appear, this invention comprises certain novel and improved constructions, combinations and arrangements of parts and elements as hereinafter described and defined in the appended claims, and illustrated, in preferred embodiment, in the accompanying drawing, in which:

Figure 2:
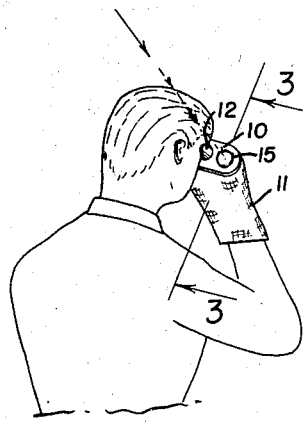
Figure 2 illustrates, on a reduced scale, an individual holding the fluoroscope in an operative position, to examine an object therein, with his back to the sun to permit the rays of the sun, as indicated by short arrows, to strike the instrument.
Figure 3:
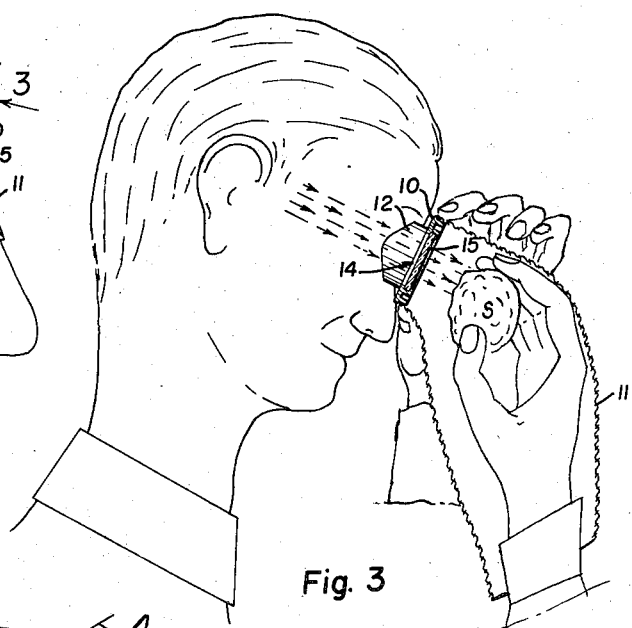
Figure 3 is another view of the individual holding the fluoroscope to examine an object therein, with the fluoroscope being in section, all as shown on the indicated line 3—3 at Fig. 2, but on an enlarged scale.

The well known phenomenon of fluorescence by various minerals in the presence of ultra-violet light provides one means of identification of the mineral and is a common laboratory test for checking of rocks or minerals. The use of ultra-violet light is thus desirable in the field of mineral identification and is a common tool of the geological engineer and the prospector. An ultra-violet light, commonly known as a black light, is often used for this purpose. However, such is not desirable for general use since the light unit will weigh as much as ten pounds and can only be used in the dark, and for field inspections it is necessary to traverse the country at night. For this reason fluorescence tests are not generally used in the field except in special circumstances, although there is a definite and real need for a simple, light-weight fluoroscope which can be used in the daytime in connection with other field activities. There is a further need for a simple, lightweight fluoroscope which will use long-wave ultra-violet light waves emitted from the sun and differentiate such from short-wave ultra-violet light. This comes about by the recognition that fluorescence tests, differentiating long-wave from short-wave ultra-violet light, will indicate the commercial value of certain minerals.

With such in view, the present invention was conceived and developed, and comprises, in essence, the combination including means for the encasement of a mineral or rock specimen to shield it from light, a light filter adapted to receive sunlight but to subject the specimen only to the ultra-violet portion of the spectrum, and an opening through the encasement means whereby the specimen can be viewed to ascertain its degree of fluorescence, all as hereinafter described in detail.

Referring to the drawing, and more particularly to the embodiment illustrated at Figs. 1 to 5, the improved fluoroscope is formed about a flat body plate 10 of any suitable size which is easy to handle and is preferably about 5¼ inches long and 2½ inches wide, with rounded ends to provide a neat, oval appearance. A tubular, sock-like hood 11 depends from this body, with one end of the hood being secured to the peripheral edge of the body and the opposite end being open for access. The hood thereby forms, in combination with the body, a sack-like container or bag and an operator can thrust his hand into the container to hold a specimen S adjacent to the body, as clearly illustrated at Fig. 3. The hood 11 is formed of flexible, light-weight material such as cloth or flexible sheet plastic, but which is substantially opaque and light resistant, and is of sufficient length so that even though a specimen is held therein, as by the operator's hand being thrust into the open end of the hood opposite the body, the specimen will be effectively shielded from all light. This is necessary since any ordinary light is so bright compared with the emitted fluorescence of a mineral specimen that the latter cannot be seen should visible light strike it.

Figure 1:
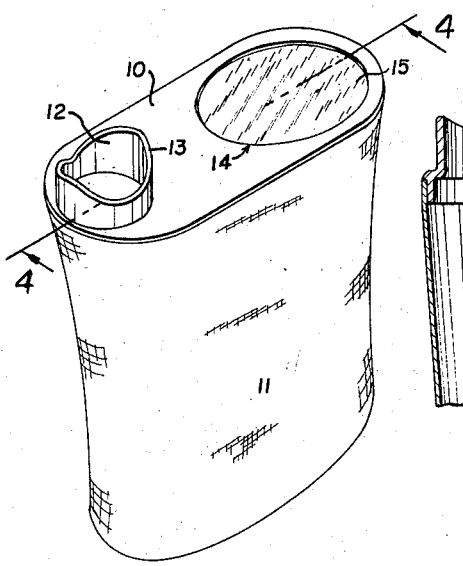
Figure 1 is a perspective view of our improved fluoroscope, as ready for use.
Figure 4:
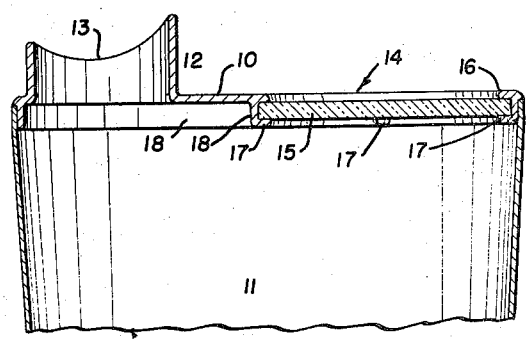
Figure 4 is a longitudinal section through the upper portion of the instrument as taken on the indicated line 4—4 at Fig. 1, but on an enlarged scale.
Figure 5:
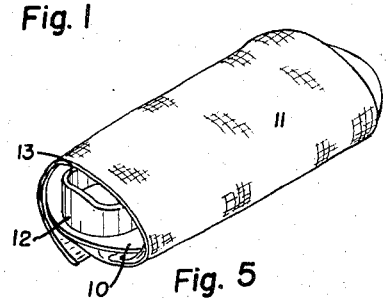
Figure 5 is similar to Fig. 1 but illustrating the instrument as being folded or wrapped as for storage.

An eyepiece 12 upstands from the surface of the body 10, at one end thereof, which is formed as a short, open, cylindrical unit having its top edge 13 contoured to fit about the operator's eye when the body 10 is positioned to outstand from either side of the operator's head as clearly illustrated at Fig. 1. In this manner, when the operator turns to a position with sunlight behind him, the sunlight rays will strike the surface of the body 10 at the side of the eyepiece.

An opening 14 extends through the surface of the body 10 opposite the eyepiece which is suitably recessed or paneled to contain a filter 15 of glass, plastic or other suitable material, and characterized by its ability to pass ultra-violet light but filter out ordinary light. Although shown as being round, the opening and filter may be shaped in any suitable manner, such as being rectangular or oval. The filter is preferably set in a recess having a short, overhanging lip 16 about the opening 14 and is locked in position by tabs 17 at the base of the recess but it may be set in other ways as hereinafter disclosed.

This filter 15 may be adapted to pass both short-wave and long-wave ultra-violet light or may be adapted to pass only one type of ultra-violet light such as long-wave ultra-violet light. The substances from which such filters are formed are generally known and not within the scope of this invention except insofar as the instrument is constructed to provide for observation of the specimen S under a selected type of ultra-violet light.

The body 10 is preferably formed of a conventional thermal-plastic substance as by injection molding, and may be of thin, light-weight construction with the peripheral edge and opening 14 being defined by rims 18, to provide for greater thickness at these points and with the cylindrical eyepiece 12 being molded into the unit as an integral part thereof. It is anticipated that with such construction, the hood 11 will be glued or welded in position upon the peripheral rim 18 but it is within the contemplation of the invention that the hood may be fastened thereto by other means as hereinafter described in detail.

The operation of this unit is at once clearly apparent, the specimen is simply thrust into the hood, the operator looks inside through the eyepiece and with his back to the sunlight to permit the sun rays to strike the filter glass, thus permitting the ultra-violet rays to pass through the glass to the specimen.

The alternate embodiment illustrated at Figs. 6 to 9 provides for a body 10a which is adapted for use with the operator facing the sun. In this unit the eyepiece may be eliminated and the edge of the body at the eyepiece will simply contain a viewing window 12a, and the body portion of the window is preferably turned downward out of the plane of the body to prevent the sun rays from striking the window 12a as the specimen is being viewed, all as clearly illustrated at Fig. 6.

Figure 6:
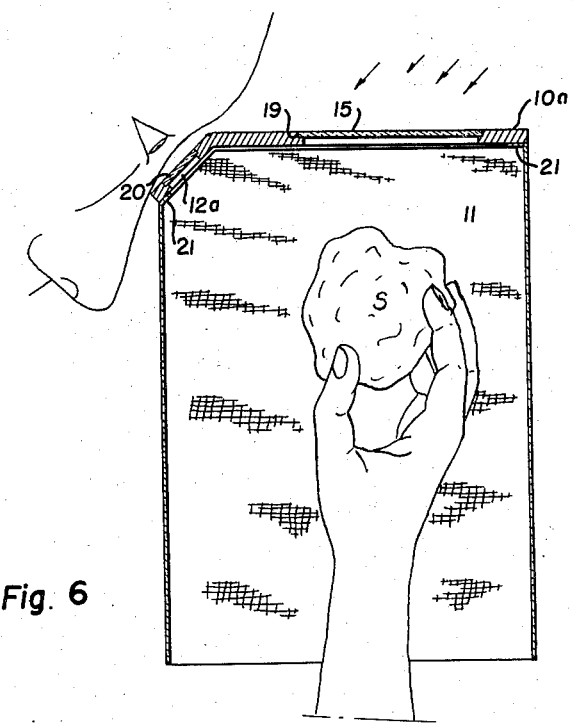
Figure 6 is similar to Fig. 3, illustrating an individual viewing an object and with the fluoroscope being shown in section, but showing an alternate embodiment of the invention.
Figure 7:
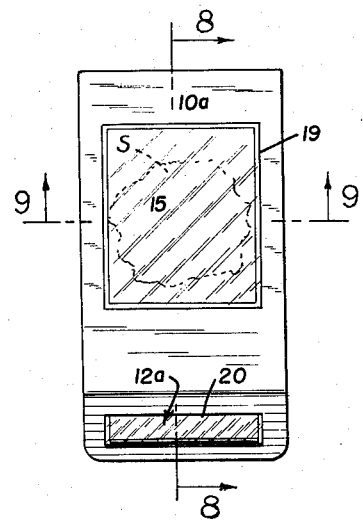
Figure 7 is a plan view of the fluoroscope illustrated at Fig. 6.

The Fig. 6 construction shows slight structural modifications. The filter 15 is placed in a rabbeted recess 19 at the top of the body 10a and the viewing window 12a may include a glass cover 20 or a spectral filter for transmitting desired emitted fluorescence inset into the body 10a in the same manner as window 12a. It is to be noted that a similar spectral filter could be adapted to the eyepiece 12 of Fig. 1 when it is desired to observe a selected type of fluorescent emission. The hood 11 is shown as being turned inwardly at its edge adjacent the body and being glued thereto as at 21.

Figure 8:
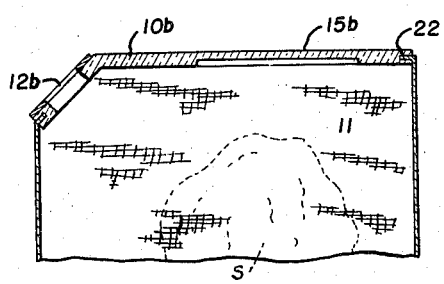
Figure 8 is a longitudinal section through the upper portion of the instrument, as taken substantially on the indicated line 8—8 at Fig. 7, and similar to Fig. 6, but showing another modification of the construction.

The construction illustrated at Fig. 8 is formed by a plastic or other suitable substance having the property of filtering ordinary light but passing ultra-violet light and the filter 15b is integral with the body 10b although it may be considerably thinner in section than the major portion of the body as illustrated. In this unit the hood is shown as being fastened to the body by a slot 22 about the edge of the body.

Figure 9:
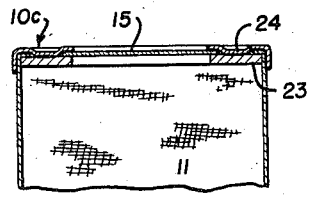
Figure 9 is a transverse section through the upper portion of the instrument, as taken substantially on the indicated line 9—9 at Fig. 7, but showing yet another modification of the construction.

The construction at Fig. 9 shows further modifications where the body 10a may be formed by two elements nested together including an inner section 23 and an outer, over-lapping cover 24. With such construction the filter 15 and hood 11 are clamped between the nesting elements as clearly illustrated.

It is obvious from the many details herein illustrated and described, that others skilled in the art can devise alternate and equivalent constructions which are within the spirit and scope of our invention; hence it is our desire that our protection be limited only by the proper scope of the appended claims.

We claim:

1. A pocket-size fluoroscope for field use in sunlight adapted to be folded into a flat pocket-sized package when not in use, comprising an opaque, flexible, sock-like hood, a substantially-flat somewhat-elongated body plate at and closing one end of the hood and about which the hood may be wrapped when the unit is not in use, a light filter window in the body plate at one end thereof adapted to filter out visible light but to pass ultra-violet light and a viewing opening at the other end thereof, the opposite end of the hood being open and defining a mouth wherein an individual may insert his hand to hold a specimen therewithin near said filter with his hand and forearm substantially preventing light from entering the hood at the mouth when the unit is held with sunlight striking the light filter and with the individual viewing the specimen therewithin through said opening with the filter window to the side of the individual and with sunlight behind the individual striking the filter window.

2. A pocket-size fluoroscope for field use in sunlight adapted to be folded into a flat pocket-sized package when not in use, comprising an opaque, flexible, sock-like hood having a mouth at one end and a rigid substantially-flat somewhat-elongated body plate at and closing the opposite end and about which the hood may be wrapped when the unit is not in use, a light filter window at one end of the body plate adapted to filter out visible light but to pass ultra-violet light to the interior of the container and an opening in the opposite end of the body plate through which a specimen inserted into the container may be viewed when the unit is held with the filter window at one side of the individual adapted to receive sunlight from behind the individual.

3. The fluoroscope defined in claim 1 wherein said viewing opening is formed by an eyepiece adapted to be set about an observer's eye to permit viewing of the interior of the container without the admission of light through said opening.

4. The fluoroscope defined in claim 2 wherein the viewing opening is formed by an eyepiece upstanding from the body plate.

5. The fluoroscope defined in claim 2 wherein the viewing opening is formed by an eyepiece upstanding from the body plate having its rim edge contoured to fit about an observer's eye with the body plate outstanding from the side of the observer.

6. The fluoroscope defined in claim 4 wherein said body plate is formed of a thin plastic sheet with peripheral rim portions adapted to attach the container sack thereto and to hold the filter window in position.

References Cited in the file of this patent

UNITED STATES PATENTS

| | | |
|---|---|---|
| 947,246 | Levison | Jan. 25, 1910 |
| 1,242,377 | Schmidt | Oct. 9, 1917 |
| 2,110,310 | Shayes et al. | Mar. 8, 1938 |
| 2,486,026 | Hills | Oct. 25, 1949 |

FOREIGN PATENTS

| | | |
|---|---|---|
| 473,043 | Great Britain | Oct. 5, 1937 |